(12) United States Patent
Cappiello

(10) Patent No.: US 9,952,894 B1
(45) Date of Patent: Apr. 24, 2018

(54) PARALLEL QUERY PROCESSING

(71) Applicant: MicroStrategy Incorporated, Vienna, VA (US)

(72) Inventor: Scott Cappiello, San Marcos, CA (US)

(73) Assignee: MicroStrategy Incorporated, Vienna, VA (US)

( * ) Notice: Subject to any disclaimer, the term of this patent is extended or adjusted under 35 U.S.C. 154(b) by 107 days.

(21) Appl. No.: 14/606,173

(22) Filed: Jan. 27, 2015

Related U.S. Application Data

(60) Provisional application No. 61/931,975, filed on Jan. 27, 2014, provisional application No. 62/021,497, filed on Jul. 7, 2014.

(51) Int. Cl.
*G06F 12/00* (2006.01)
*G06F 9/46* (2006.01)
*G06F 9/50* (2006.01)

(52) U.S. Cl.
CPC ............ *G06F 9/467* (2013.01); *G06F 9/5077* (2013.01)

(58) Field of Classification Search
CPC ................................ G06F 9/467; G06F 9/5077
See application file for complete search history.

(56) References Cited

U.S. PATENT DOCUMENTS

| 5,414,469 | A | 5/1995 | Gonzales | |
|---|---|---|---|---|
| 7,181,444 | B2 | 2/2007 | Porter et al. | |
| 8,402,052 | B2 | 3/2013 | Sano et al. | |
| 8,495,627 | B2 * | 7/2013 | Barsness | G06F 9/5077 718/1 |
| 8,996,523 | B1 | 3/2015 | Fisher | |
| 9,411,853 | B1 | 8/2016 | Dovrtel | |
| 2002/0032676 | A1 * | 3/2002 | Reiner | G06F 17/30445 |
| 2003/0233403 | A1 * | 12/2003 | Bae | G06F 17/30861 709/203 |
| 2004/0165780 | A1 | 8/2004 | Maki | |
| 2005/0050036 | A1 | 3/2005 | Araki | |
| 2005/0187977 | A1 * | 8/2005 | Frost | G06F 17/30584 |
| 2006/0155687 | A1 | 7/2006 | Chou | |
| 2006/0155688 | A1 | 7/2006 | Chou | |
| 2006/0227970 | A1 | 10/2006 | Nakano | |
| 2007/0130131 | A1 | 6/2007 | Porter et al. | |
| 2009/0104123 | A1 * | 4/2009 | Yang | A61K 49/0002 424/9.3 |
| 2009/0112949 | A1 | 4/2009 | Ergan | |
| 2011/0040733 | A1 * | 2/2011 | Sercinoglu | G06Q 30/02 707/688 |
| 2012/0084296 | A1 | 4/2012 | Waters | |
| 2012/0136649 | A1 | 5/2012 | Freising et al. | |
| 2012/0179714 | A1 * | 7/2012 | Chandhok | G06F 17/3087 707/769 |

(Continued)

*Primary Examiner* — John A Lane
(74) *Attorney, Agent, or Firm* — Fish & Richardson P.C.

(57) ABSTRACT

Systems and methods are disclosed for distributing an in-memory data store over a plurality of independent data partitions. For example, the method includes associating each of the plurality of independent data partitions with at least one of a plurality of processing units such that one or more data sets in a corresponding each of the plurality of independent data partitions are processed by the at least one of the plurality of processing units. A query execution engine is provided for causing the plurality of processing units to execute, in parallel, a series of queries to the plurality of independent data partitions.

18 Claims, 7 Drawing Sheets

(56) References Cited

U.S. PATENT DOCUMENTS

| | | |
|---|---|---|
| 2012/0226804 A1 | 9/2012 | Raja |
| 2013/0013552 A1 | 1/2013 | Eshleman |
| 2013/0018903 A1 | 1/2013 | Taranov |
| 2014/0195558 A1 | 7/2014 | Murthy |
| 2014/0280372 A1 | 9/2014 | Huras |
| 2015/0169688 A1* | 6/2015 | Halverson ......... G06F 17/30289 707/718 |
| 2015/0178052 A1* | 6/2015 | Gupta ....................... G06F 8/34 717/105 |
| 2015/0317362 A1 | 11/2015 | Teranishi |
| 2015/0355989 A1* | 12/2015 | Hayden ............... G06F 13/4027 714/56 |
| 2016/0048584 A1 | 2/2016 | Valentin |
| 2016/0105328 A1* | 4/2016 | Cooper ................ G06F 3/0484 715/736 |
| 2016/0154852 A1 | 6/2016 | Chen et al. |

* cited by examiner

PARALLEL QUERY PROCESSING

CROSS REFERENCE TO RELATED APPLICATIONS

This application claims the benefit of U.S. Patent Application No. 61/931,975, filed Jan. 27, 2014 and U.S. Patent Application No. 62/021,497, filed Jul. 7, 2014, the contents of both are incorporated by reference.

FIELD

This description relates to in-memory data processing.

BACKGROUND

Computer systems are used to manage and store data in a structure known as a database. As such, computers can be used to analyze data and generate reports based on the analysis results. For instance, computer systems can filter data and calculate metric values based on the filtered data, ultimately providing a report including the calculated metric values. A database is an organized repository of data. There are various ways in which the data can be organized. Schemas are used to describe the different organizations of data.

Computers systems have two types of physical data storage—disk (e.g., hard drive) storage and Random Access Memory (RAM) storage. Typically, computer systems have more disk storage than RAM, but it can often take longer (e.g., in the range of 100-1,000 times longer) to read data from the disk than from RAM. This can result in noticeable performance degradation.

SUMMARY

In general, one innovative aspect of the subject matter described in this specification can be embodied in methods that include the actions of distributing an in-memory data store over a plurality of independent data partitions, associating each of the plurality of independent data partitions with at least one of a plurality of processing units such that one or more data sets in a corresponding each of the plurality of independent data partitions are processed by the at least one of the plurality of processing units, and providing a query execution engine for causing the plurality of processing units to execute, in parallel, a series of queries to the plurality of independent data partitions.

These and other embodiments can each optionally include one or more of the following features. One or more of the plurality of processing units comprise individual processor cores of a multi-core processor. The distributing the in-memory data store over the plurality of independent data partitions comprises partitioning one or more tables of the in-memory data store across the plurality of independent data partitions as the plurality of independent data partitions. The actions include sharing one or more tables of the in-memory data store over the plurality of independent data partitions. The actions include presenting within a dashboard a visualization of the results from the processing of the series of queries to the in-memory data store. The actions further include generating the series of queries based on one or more visualizations to be displayed in a dashboard application. The plurality of independent data partitions are distributed over a plurality of nodes, each node comprising one or more of the plurality of processing units.

The actions include monitoring a processing status of the plurality of processing units, and balancing a processing load across the plurality of processing units in response to the monitored processing status. The actions include detecting one of a failure state or an abnormal condition state of the at least one of the plurality of processing units, and in response to the detected state, effecting a failover to another one of the plurality of processing units to ensure continued processing of series of queries. The actions include receiving a transaction to be processed on the in-memory data store, providing a first plurality of master nodes for deriving, from the received transaction, the series of queries to the in-memory data store, and a second plurality of worker nodes, wherein at least one of the second plurality of worker nodes comprises the plurality of independent data partitions across which the in-memory data store is distributed. The actions include, based on a user input, initiating the transaction at a selected one of a) an application programming interface layer, b) a dashboard engine, or c) both the application programming interface layer and the dashboard engine.

The actions include loading all data associated with a complete application into the in-memory data store. The actions include loading two or more star schemas into the in-memory data store. The actions include loading into the in-memory data store two or more fact tables. The fact tables include fact tables with varying levels of granularity. The actions include loading into the in-memory data store one or more sets of many-to-many relationship tables. The actions include providing, via the dashboard, a user interface for receiving user input defining one or more filters related to first desired information, and generating the series of queries in response to the user input defining the one or more filters related to the first desired information. The first desired information comprises market intelligence data. The actions include loading into the in-memory data store all market intelligence data used by the dashboard.

In general, another innovative aspect of the subject matter described in this specification can be embodied in methods that include the actions of receiving one or more transactions to be carried out on an in-memory data store, each transaction comprising one or more queries to respective independent data partitions within the in-memory data store, executing, in parallel, by processing units associated with corresponding ones of independent data partitions, the one or more queries, and presenting, within a dashboard associated with the in-memory data store, a visualization of the results from the processing of the series of queries to the in-memory data store.

Other embodiments of this aspect include corresponding systems, apparatus, and computer programs recorded on computer storage devices, each configured to perform the operations of the methods.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
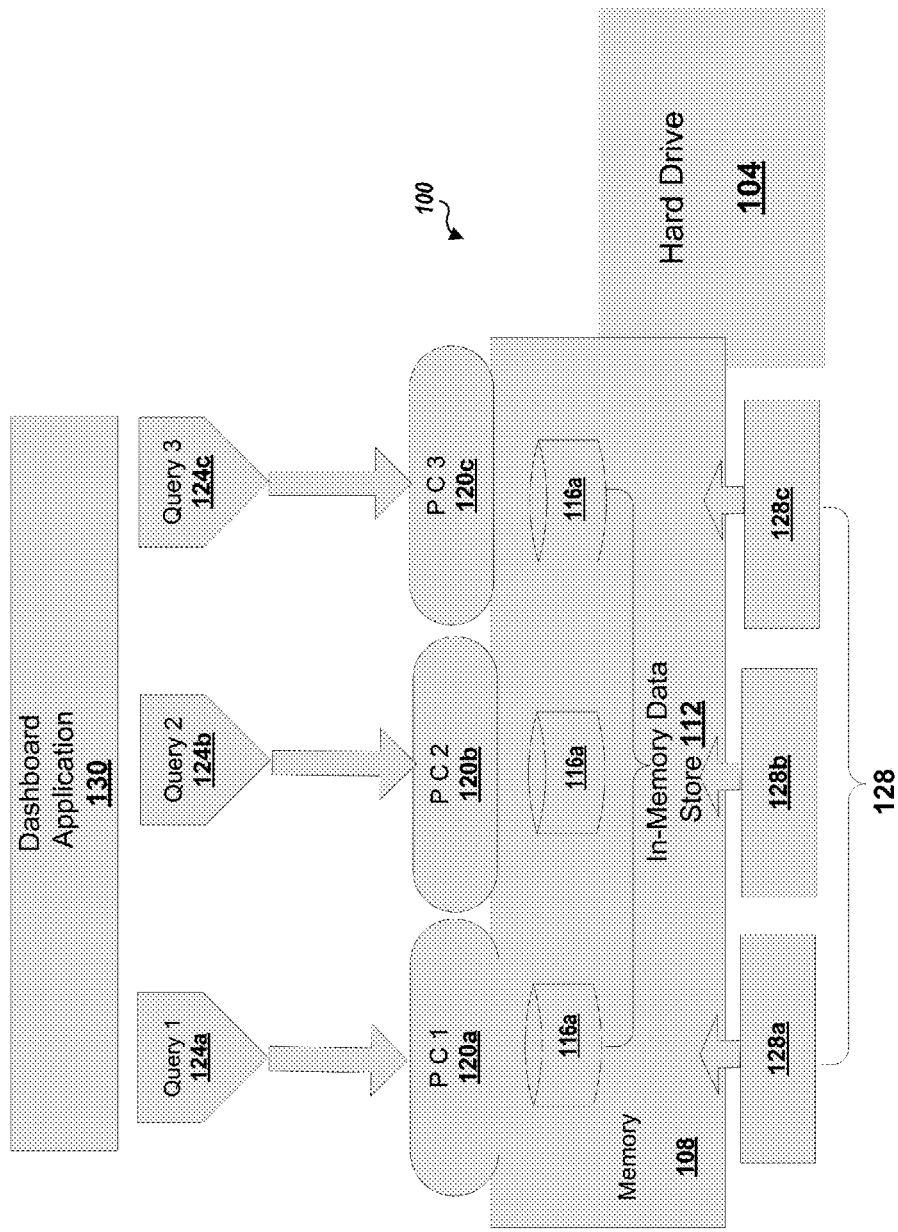
FIG. 1 is a block diagram of an example architecture of an in-memory analytic data store.

With the advent of in-memory processing, data can be loaded into the RAM (or sometimes, flash memory) instead of disk storage. This allows for faster query execution when dealing with large amounts of data.

In some implementations, an in-memory analytic database or data store can be distributed over a plurality of independent data partitions. Each of the plurality of independent data partitions can be associated with at least one of a plurality of processing units (e.g., processor cores of a multi-core computer processor). This way, one or more data sets of each of the plurality of independent data partitions are processed by at least one of the plurality of processor cores. For example, a data store or database transaction can include one or more queries performed on the in-memory data store. A series of such queries involving the in-memory data store can be processed in parallel across the plurality of processor cores.

A data store transaction can include, for example, a single logical operation on the data stored in the in-memory data store. For example, a data store transaction can include a transfer of funds from one bank account stored in a first data store at one location to another bank account stored in a second, different data store that is at another geographical location. The data store transaction can proceed as either a single query on the first data store, or a series of queries to multiple tables within the first data store to carry out the data store transaction. Similarly, the transaction on the second data store can proceed in the form of one or more update or write queries to the second data store.

In some examples, the in-memory analytic data store can provide broad schema support. In these examples, any arbitrary schema can be loaded into the in-memory analytic data store. For instance, the in-memory analytic data store can support multiple and varied dimensional schemas. Dimensional schemas are a type of database schemas that are used for storing and processing historical data. Dimensional schemas can be characterized in terms of facts, measures and dimensions. Facts describe data that can be analyzed, such as sales numbers or cost dollars. For example, facts can be aggregated. Measures are calculations based on facts. On the other hand, dimensions identify and categorize data. For example, dimensions describe data that can be used to generate groups and filters.

A typical relational schema can include definitions for tables within the database, fields of the tables, relationships between the tables, views involving the tables, indexes, functions, and other elements. A dimensional schema, on the other hand, is a type of database schema in which facts or measures that quantify a business are stored separately from descriptive elements (or dimensions) that describe the business. A dimensional schema can be further categorized as a star or snowflake schema, where the objects of the star or snowflake schema are database tables. In some implementations, the dimensional schema can be a single table.

A star schema consists of one or more fact tables referencing a plurality of dimension tables. In general, a fact table consists of the measurements, metrics or facts of a business process. The fact table is typically located at the center of the star schema with the dimension table surrounding the fact table. Dimension tables contain descriptive attributes (i.e. fields). For example, the descriptive attributes are typically textual fields. In a snowflake schema the tables are arranged such that the overall appearance resembles a snowflake shape. In particular, the snowflake schema is represented by centralized fact tables that are connected to multiple dimension tables.

Current in-memory cubes are often restricted to a single star schema, which makes the in-memory cubes closer to a cached result set based report. In some implementations, the in-memory analytic data store can be extended to receive data arranged in a variety of schemas. For example, the in-memory analytic data store can be loaded with multiple star schemas. For example, the in-memory analytic data store can be loaded with multiple fact tables and/or fact tables with varying grains, many-to-many (M-M) relationship tables, and entity-relation (ER) model semantics. In this manner, the in-memory analytic data store is made to resemble raw data that is staged in-memory.

With respect to ER model semantics, data that is loaded into the in-memory analytic data store is abstracted into business dimensions and measures. In some implementations, users can interact with the abstracted data to answer business questions using, e.g., a web based interface. In some examples, the web based interface can be used to build dashboards.

In some examples, the techniques described herein can be used for implementing an embedded in-memory, column-oriented, distributed, analytic data store that is coupled with a dashboard and/or visualization engine and that provides rapid query response and analytic processing. Data is partitioned in various nodes on memory components and processed in parallel using load balancing and failover techniques.

In some implementations, the in-memory data store described herein includes a column-oriented, distributed, analytic data store with a tightly-coupled dashboard and visualization engine for rapid application development. In this regard, the architecture implementing the in-memory analytic data store uses information about an application and/or design aspects of a dashboard to generate queries to the in-memory data store. In some implementations, the column-oriented, distributed, analytic data store can be embedded in memory components to provide fast responsiveness and data retrieval. With this structure, the analytic engine can be used to build fast-response analytical applications for various platforms, such as web applications and/or mobile device applications.

The in-memory analytic data store can be designed with a focus on read-only analytics, and may not be an ACID (Atomicity, Consistency, Isolation, Durability) compliant general purpose database. ACID refers to database properties that provide an assurance that transactions being processed on the database are being processed reliably. In some implementations, the analytic data store can thus handle any type of raw data. The analytic data store can provide fast query response time because the data is stored in-memory. In some implementations, the analytic data store can have data partitioned and processed in parallel. In some implementations, the data for an entire application can be loaded into memory and processed from memory.

FIG. 1 shows an example conceptual diagram of a computer system 100. For example, computer system 100 can be implemented on or more computers (or nodes). As shown, computer system 100 can be conceptually represented as having two data storage areas, a hard disk 104 and a memory

108. The computer system 100 includes a dashboard application 130. Dashboard application 130 can include an interface (as described in detail below) for displaying, to a user, grids and graphs based on underlying data.

For example, memory 108 can be a random access memory or a flash memory. In some implementations, memory 108 allows data items to be read and written in a substantially similar amount of time regardless of an order in which the data items are accessed. In this regard, memory 108 can be different from, for example, hard disk 104 where the time to read and write data items can vary significant depending on the physical locations of the data items in the recording medium and because of mechanical limitations such as media rotation speeds and arm movement delays.

Memory 108 includes an in-memory data store 112. For example, the in-memory data store can be partitioned into one or more data sub sets 116a-c. In this example, one or more data sub sets 116a-c can include partitions (e.g., a portion) of one or more tables within data store 112. Although three data sub sets 116a-c are shown and described here, there can be fewer or more (perhaps many more) than the three data sub sets 116a-c. Each data sub set 116a-c is associated with one or more processing units 120a-c. Although three processing units 120a-c are shown and described here, there can be fewer or more (perhaps many more) than the three processing units 120a-c. In some examples, a processing unit 120a can be associated with more than one data sub set 116a-c.

For example, processing units 120a-c can be one or more processor cores of a multi-core processor. For examples, multi-core processors can have two cores (dual-core CPUs, for example AMD Phenom II X2 and Intel Core Duo), four cores (quad-core CPUs, for example AMD Phenom II X4, Intel's i5 and i7 processors), six cores (hexa-core CPUs, for example AMD Phenom II X6 and Intel Core i7 Extreme Edition 980X), eight cores (octo-core CPUs, for example Intel Xeon E7-2820 and AMD FX-8350), ten cores (for example, Intel Xeon E7-2850), or more. In some implementations, a multi-core processor implements multiprocessing in a single physical package.

In some implementations, the computer system 100 can be implemented across multiple nodes. For example, a first processing unit 120a can each be a processor core of a multi-core processor in a first node, and a second processing unit 120b can be a processor core of a multi-core processor in a second, different, node. In some implementations, while processing unit 120a is physically located in a first node (e.g., a first processor core in the first node), processing units 120b and 120c can be physically located in a second, different node (e.g., second, different processor cores in the second node). In some implementations, data sub set 116a can be physically located in the first node, and data sub sets 116b and 116c, corresponding respectively to each of processing units 120b and 120c, can be physically located in the second, different node. Although a few example combinations of processor cores and partitioned data sets are described here, any number of combinations of processor cores and partitioned data sets, spread out over a single node or multiple nodes, may be used.

In some examples, one or more database transactions can be processed in the form of one or more queries 124a-c to the in-memory analytic data store 112. For example, a high level database transaction can be divided into the multiple queries 124a-c. In some examples, the number of queries 124a-c can be as high as a number of parallel processing units 120a-c that are available to process the queries 124a-c in parallel. As shown, the queries 124a-c can be processed in parallel by the respective processing units 120a-c. For example, query 124a may require the summation of a column of data (e.g., numbers) residing in a portion of the data sub set 116a. For example, the column of data relates to sales made by a customer over a period of time. This summation operation can be handled by respective processing unit 120a.

Substantially at the same time, a different (but perhaps related) operation, e.g., retrieving transaction dates for the sales fields being processed through the summation operation, can be handled by processing unit 120b operating on data sub set 116b. The results from respective queries 124a and 124b can be sent back to a query engine (see, e.g., FIG. 2 described in further detail below) to assemble the information for display or other operation, such as storage or further analysis.

For example, computer systems implementing the techniques described herein (e.g., computer system 100 of FIG. 1) uses information about an application and/or design aspects of a dashboard application 130 to generate queries 124a-c to the in-memory data store. For example, dashboard application 130 can include a dashboard interface, as described in detail below, in which two or more grids (e.g., tables of data) are based on same or similar content. In some implementations, the computer system 100 can cause a single combined query (e.g., only query 124a) or parallel queries (e.g., queries 124a-c) to be executed on the in-memory data store for the two or more grids.

In an example, dashboard application 130 can have two visualizations representing sales trends over time through both a line chart and a grid of data. In the computer system 100, the data needed for the two example visualizations can be the same and so can be accessed based on either a single query or multiple parallel queries to in-memory analytic data store 112. In some examples, dashboard application 130 can include two or more visualizations based on selecting key performance indicators (KPIs) from a same set of underlying data in in-memory data store 112. Because the underlying data involved is the same, the visualizations can be executed together—e.g., a single query or multiple parallel queries can be executed together. In some implementations, dashboard application 130 can include visualizations that are based on same or similar filtering criteria, and as such queries corresponding to these visualizations can be combined into a single query and/or executed together.

In some implementations, a data service engine 128 can receive data from multiple high volume data storage systems and load the received data into in-memory data store 112. In some examples, data service engine 128 can perform parallel data loading into data store 112 through parallel processes 128a-c. For example, processes 128a-c can load data from a corresponding data sources into respective in-memory data store sub sets 116a-c in parallel. In some implementations, the loaded data can be all of the market intelligence data needed to generate output for an end user. For examples, the output can be displayed to the end user through an application interface, e.g., a dashboard/visualization engine as described in further detail below.

The in-memory analytic data store 112 can enable bigger data volume given its partitioned and parallel processing structure. For instance, certain in-memory technologies may be limited to two billion rows. By dividing datasets into partitions (e.g., data store sub sets 116a-c), each partition or sub set 116a-c can have up to two billion rows, which increases the overall data volume. The partitioning can be performed on a single node or over multiple nodes as described below. For single node partitioning, data partitions are distributed across multiple cores on a single machine and grids/views are processed in parallel across all cores on a single multi-processor node. For multiple node partitioning, data partitions are distributed within and across multiple nodes (e.g., machines) and queries processed in parallel within and across multiple nodes.

In some implementations, the in-memory analytic data store 112 can provide broader analytic functionality. For instance, current in-memory cubes do not support full filter and metric functionality. In current in-memory cubes, "single pass" queries can be executed on underlying data. As such, complex business questions, such as, returning regional sales for those customers that bought certain widgets worth more than a predetermined number, could not be run on the data. The in-memory analytic data store 112, however, extends to "multi-pass" analytics with multiple levels of aggregation and/or filtering. For example, computer system 100 can process metrics having conditions. In some examples, computer system 100 can also set qualification filters on the data.

Figure 2:
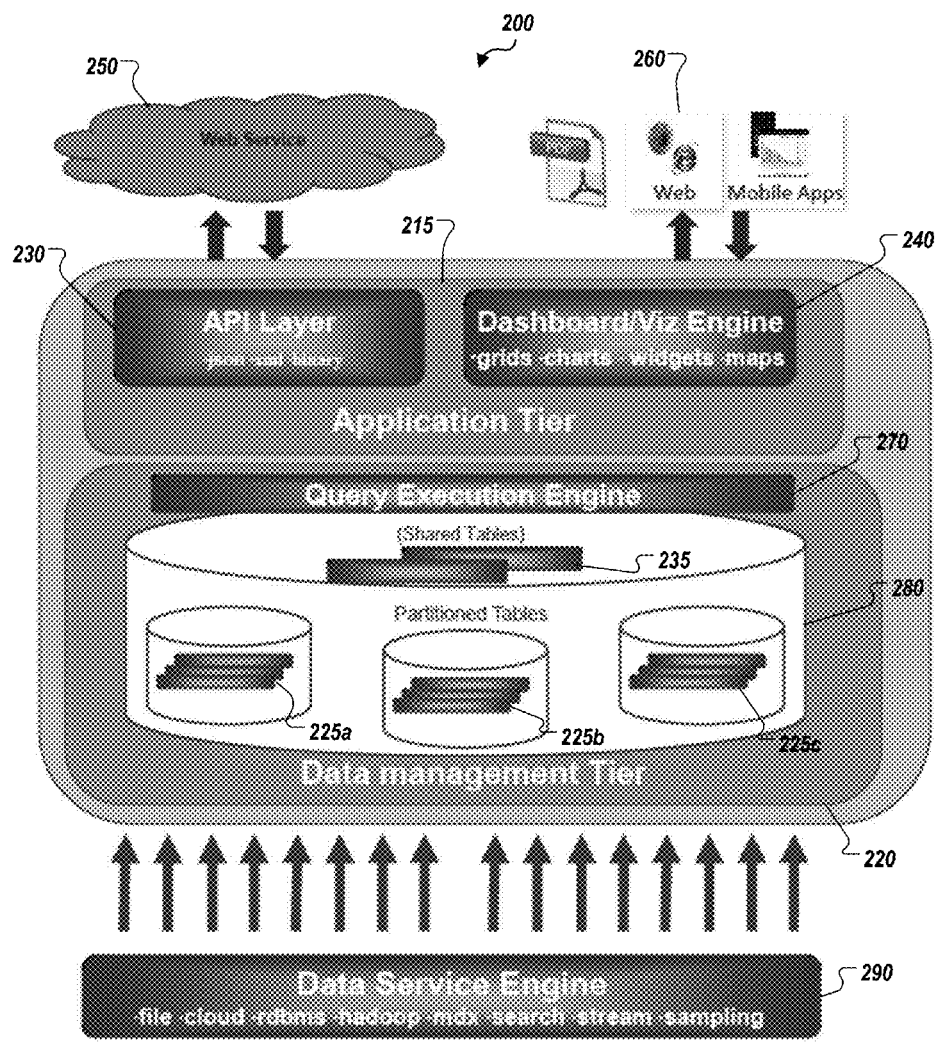
FIG. 2 is a block diagram illustrating an example architecture of a node.

In some implementations, the computer system of FIG. 1 can be implemented on a single node. Referring to FIG. 2, an example architecture of a single node 200 is shown. Node 200 can be a server implementing an in-memory analytic data store 280. Node 200 can include an application tier 215, a data management tier 220, and a data service engine 290. Application tier 215 includes an application programming interface (API) layer 230 and an intelligence dashboard/visualization engine 240. For example, API layer 230 includes specifications describing how components in data management tier 220 can interact with other components, e.g., one or more web services 250. For example, API layer 230 interfaces with web services 250 to receive data from one or more other applications (e.g., market intelligence data) and/or to provide collaborative functionality with the one or more other applications (e.g., receive user input from the one or more other applications and provide data to be output by the one or more other applications).

Figure 4:
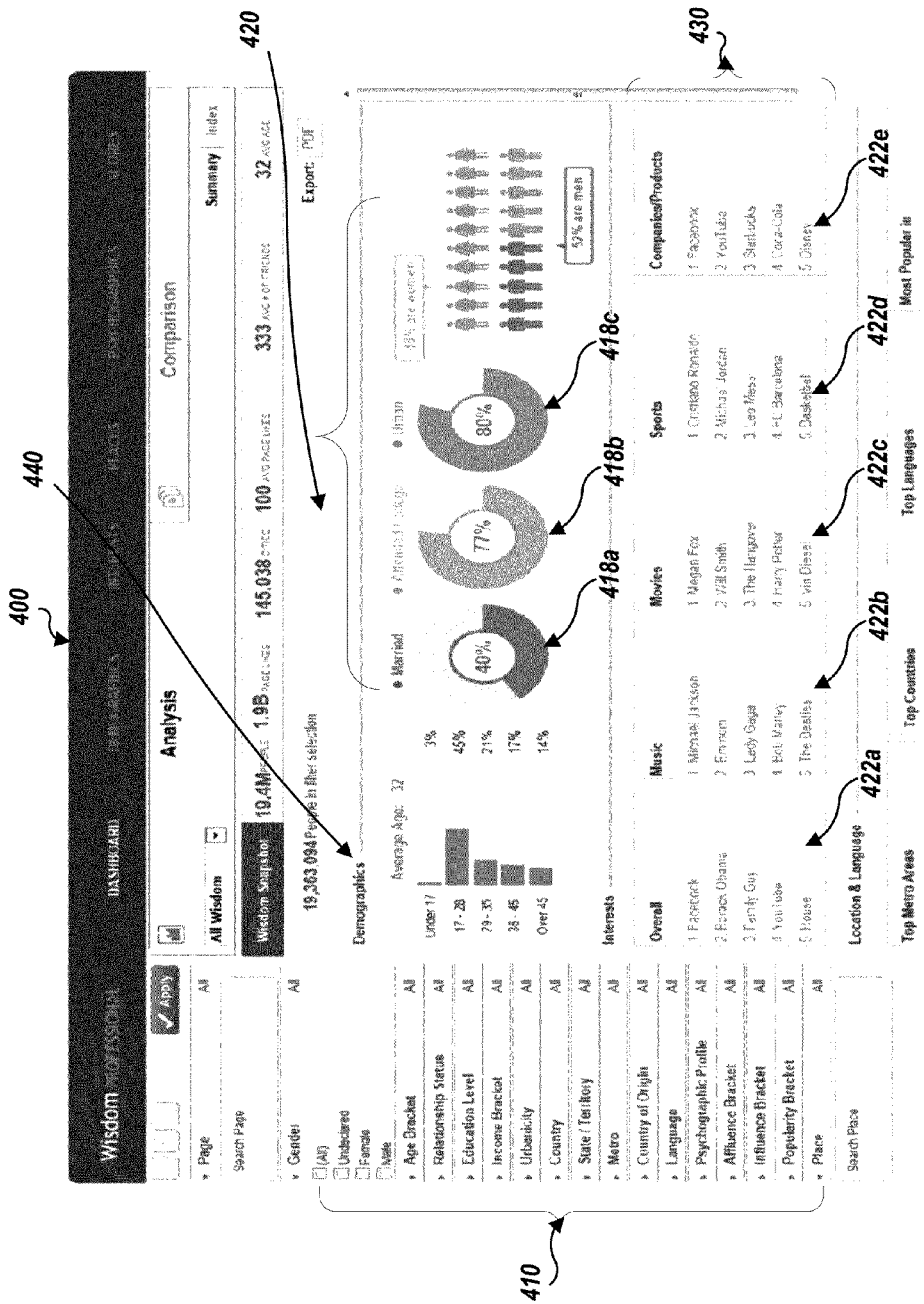
FIGS. 4 and 5 illustrate example user interfaces.

Dashboard/visualization engine 240 interacts with one or more of web applications, mobile applications, and documents 260 to receive user input and provide user output. For instance, dashboard/visualization engine 240 can generate a user interface 400 as shown in FIG. 4. For example, dashboard/visualization engine 240 can interact with a web or mobile application to output the user interface 400 on a user's device, e.g., a handheld device. Dashboard/visualization engine 240 also can output user interface 400 as a document or file that a user device is able to store and display. Application tier 210 can be a tightly-coupled with globally optimized query execution across multiple visualizations in single dashboard. Application tier 210 can also include a "data-only" JSON REST API and can provide super-fast search-style selectors.

Data management tier 220 can include a query execution engine 270 and an in-memory data store 280. Query execution engine 270 receives queries (similar to queries 124a-c described in connection with FIG. 1) from application tier 210 and processes the received queries on data stored in in-memory data store 280. Query execution engine 270 can access data from the in-memory data store 280, perform analytics on the accessed data, and provide, to the application tier 215, the accessed data and/or the results of the performed analytics. In some implementations, query execution engine 270 can divide a database transaction into a plurality of queries for processing on the respective data partitions.

In-memory data store 280 can be partitioned as shown. In some implementations, in-memory data store 280 can be partitioned to include, e.g., multiple partitioned tables 225a-c and one or more shared tables 235 that are stored in-memory. In some implementations, while each of the partitioned tables 225a-c is associated with a corresponding processor core, shared tables 235 can be accessed by multiple processor cores at substantially the same time. For example, the in-memory data store 280 can include a customer transactions table that can be partitioned such that each of the partitioned tables 225a-c has one million customer transaction entries. In some implementations, a shared table can be a customer table that is shared among two or more processor cores.

Query execution engine 270 is configured to process queries to multiple partitioned tables 225a-c and one or more shared tables 235 in parallel to provide fast data retrieval and enable a larger volume of data to be stored in-memory. For example, partition tables 225a-c can include a plurality of customer transaction records. Data management tier 220 can be a high-performance in-memory data tier that performs distributed in-memory analytics on the customer transaction records.

As explained above, data management tier 220 can have data partitioned across multiple processing cores and can perform parallel execution of queries across all cores according to a partition logic. In some implementations, a partition attribute can be defined to couple the processing cores to the respective data partition table e.g., any one of partition tables 225a-c. For example, if a partition table 225a contains customer transaction information, a customer transaction attribute such as a transaction identification code ("ID") can be used as a partition attribute. In this regard, in some examples, the transaction ID can be processed through a hash function and sent to partition tables 225a-c to determine which partition 225a-c has the corresponding transaction information. In some implementations, while multiple customers can be located in a partition table 225a, a customer located on partition table 225a can remain on that partition table 225a indefinitely (e.g., until the customer record is reallocated elsewhere).

Data service engine 290 can receive data from multiple high volume data storage systems and load the received data into the in-memory data store 280 in the data management tier 220. The data service engine 290 can perform parallel data loading into the in-memory data store 280 from multiple data sources. The loaded data can be all of the market intelligence data accessible to generate output through the dashboard/visualization engine 240. For example, data service engine 290 loaded information can be based on one or more of information contained on files, the cloud, a relational database management system (RDMBS), information from Apache Hadoop (an open source software framework for large scale storage and processing of data), multidimensional expressions (MDX), search query results, stream, and sampling information.

In some implementations, any arbitrary schema can be loaded into the in-memory analytic data store. In some implementations, the in-memory analytic data store 280 can be loaded with multiple star schemas and not just a single star schema. A star schema organizes a database such that business process data is separated into facts, which hold measurable, quantitative data about a business, and dimensions which are descriptive attributes related to the facts. For example, facts can include sales price, sale quantity, and time, distance, speed, and weight measurements. Related dimension attribute can include product models, product colors, product sizes, geographic locations, and salesperson names. In one star schema, the data is organize such that the fact table is typically located at the center of the star schema with the dimension table surrounding the fact table. Thus, multiple star schemas can each have a facts table at its center and a plurality of associated dimensional tables surrounding the facts tables.

In some implementations, fact tables at multiple levels can be loaded into the in-memory analytic data store. As an illustration, a first star schema can include sales transactions information, including customer information, transaction detail at a timestamp level, and store of purchase information. A second star schema can include store inventory information, such as products information, sales associates' information, and purchase information at a weekly inventory level. A third star schema can include corporate-level pricing data. Thus, each star schema represents data at a different level of granularity and detail. In some implementations, the in-memory analytic data store 280 can be loaded with all such star schemas.

Figure 3:
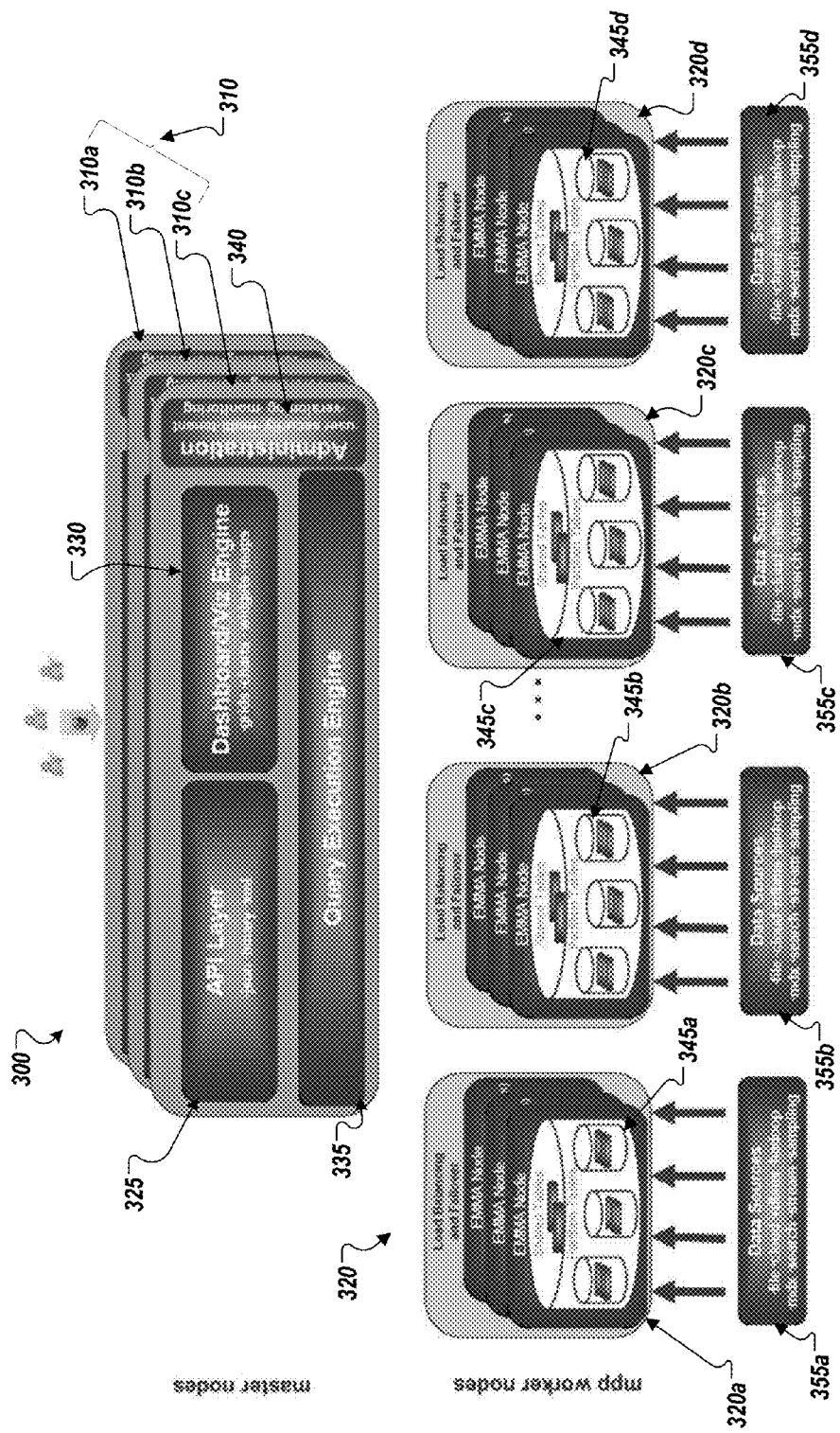
FIG. 3 is a block diagram illustrating an example system with multiple nodes.

FIG. 3 illustrates an example system 300 with multiple nodes 310, 320. The system 300 includes master nodes 310, further delineated as master nodes 310a-c, and worker nodes 320, further delineated as worker nodes 320a-d. Although FIG. 3 illustrates three master nodes 310a-c and four worker nodes 320a-d, the system 300 can include more (perhaps, many more) or fewer master nodes 310a-c and worker nodes 320a-d.

As shown, each of the master nodes 310a-c includes an API layer 325, a dashboard and/or visualization engine 330, a query execution engine 335, and an administration engine 340. The API layer, dashboard/visualization engine 330, and query execution engine 335 can be similar to the API layer 230, the dashboard/visualization engine 240, and the query execution engine 270 described above with respect to FIG. 2, except with for query execution engine 270 operating over multiple, different worker nodes 320a-d. Administration engine 340 handles administration functionality for the corresponding master node 310, including user security, multi-tenant administration, versioning, and process monitoring. Each of master nodes 310a-c can be operated on a separate machine.

As shown, each of the worker nodes 320a-d includes a corresponding in-memory analytic data store 345a-d, each of which can be similar to the in-memory data store 280 described above with respect to FIG. 2. Each of worker nodes 320a-d can perform load balancing and failover operations for its own in-memory analytic data store nodes and/or across all of the worker nodes 320. In this regard, in some implementations, a status of a node is monitored. If, for example, a node (or a core within the node) fails or the load on a node (or a core within the node) exceeds a predetermined maximum, its load is immediately redistributed across the remaining nodes (or cores). For example, if an abnormal condition state is detected with respect to one or more nodes (or cores in the nodes), a failover can be effected to another one of the plurality of nodes (or processor cores) to ensure continued operation.

Each of the worker nodes 320a-d can receive data from multiple large volume data sources and load the received data in parallel as described above. For example, each worker node 320a-d can be in communication with one or more corresponding data sources 355a-d. Although FIG. 3 illustrates a one-to-one correspondence between worker nodes 320a-d and data sources 355a-d, it should be understood that any variation of relationships between the worker nodes 320-a-d and data sources 355a-d is possible. For example, a single data source, e.g., data source 355a (say, a Hadoop system), can provide data to all four worker nodes 320a-d. The data sources 355a-d can include high volume data storage systems. Accordingly, a data services engine (e.g., data service engine 290 of FIG. 2) can load data from the data sources 355a-d in parallel into the in-memory data stores 345a-d. In some implementations, the loaded data can be all of the market intelligence data needed to generate output through a dashboard/visualization engine.

In some implementations, the raw data from one or more information sources, e.g., a Hadoop system, can be processed before being loaded (e.g., via data service engine 290 of FIG. 2) to an in-memory analytic data store. An example implementation of an interface for such processing is described in U.S. provisional Application No. 61/932,099, filed Jan. 27, 2014.

The system 300 can be configured differently depending on the type of application and the amount of data needed to support the application. For instance, for a market intelligence application that uses 2.2 billion rows, the system 300 can have a memory footprint of 59 GB and can have a hardware configuration of a single server with 32 cores and 1 TB of RAM. For a social media application that uses 2.8 billion rows, the system 300 can have a memory footprint of 100 GB and can have a hardware configuration of a single server with 40 cores and 1 TB of RAM. For an e-commerce application that uses 3.8 billion rows, the system 300 can have a memory footprint of 500 GB and can have a hardware configuration of a single server with 80 cores and 1 TB of RAM. For a social media application that employs massively parallel processing techniques and uses 80 billion rows, the system 300 can have a memory footprint of 5-6 TB and can have a hardware configuration of 100 worker nodes, each with 16 cores and 144 GB of RAM, which results in a total of 1600 cores and 14 TB of RAM.

The system 300 can be configured to support use case characteristics with data volume in the 100's of GB to 1 TB range. In these cases, the system 300 can provide fast response time, as all executions are against in-memory datasets and datasets and queries are partition-friendly. The system 300 can serve external-facing applications, although some applications can be internal. The data volume that can be handled by system 300 may not be limited to a particular size, such as 1 TB. In fact, depending on the available nodes in system 300, a variety of data volumes can be serviced by system 300.

FIG. 4 illustrates an example user interface 400 of an intelligence dashboard. As shown, interface 400 comprises a plurality of control objects 410-440. For example, control objects include grids (e.g., data displayed in table format), graphs, text fields, shapes, etc. that users can use to navigate through the data presented through interface 400. Interface 400 can be powered by the in-memory analytic data store described throughout this disclosure (e.g., in-memory analytic data store 112 of FIG. 1). In this regard, in some implementations, the analytic data store powers an extensive market intelligence network that provides the data shown in user interface 400. For example, computer systems implementing the techniques described herein (e.g., computer system 100 of FIG. 1) uses information about an application and/or design aspects of dashboard 400 to generate queries to the in-memory data store.

For example, all of the market intelligence data used by and displayed through the intelligence dashboard interface 400 can be loaded into the in-memory analytic data store. In this example, user interface 400 receives user input defining filter criteria 410 related to the market intelligence information a user seeks. Filter criteria 410 can include demographics data or any other type of data as shown in interface 400 or otherwise available to filter the market intelligence data stored in the in-memory analytic data store. For example, the user may be able to filter the data by gender, age, relationship status, education level, income bracket, urbanicity, etc. A query execution engine (e.g., query execution engine 270 of FIG. 2) can receive the user input defining filter criteria 410, and execute queries (e.g., queries 124a-c of FIG. 1) to access the market intelligence data stored in an in-memory analytic data store. In some examples, the query execution engine can receive the accessed data (e.g., data from the in-memory analytic data that complies with the filter criteria 410), perform analytics on the accessed data, and output the results of the analytics to user interface 400.

As shown in FIG. 4, the user interface 400 specifies the demographic data used to generate the dashboard output broken down into various categories 420 (e.g., as shown in charts 418a-c) and outputs ranked lists of interests 422-a-e for people that fall within the demographic profile 440 defined by the filter criteria 410. For example, the categories 420 can include what percentage of the relevant population is married, has attended college, or lives in an urban area. Other types of output and data visualization can be used. In addition, the user interface 400 can receive additional user input to refine or change the filter criteria 410 or the results sought and the user interface 400 can dynamically update in short order given the in-memory data retrieval and processing that occurs responsive to the additional user input.

Figure 5:
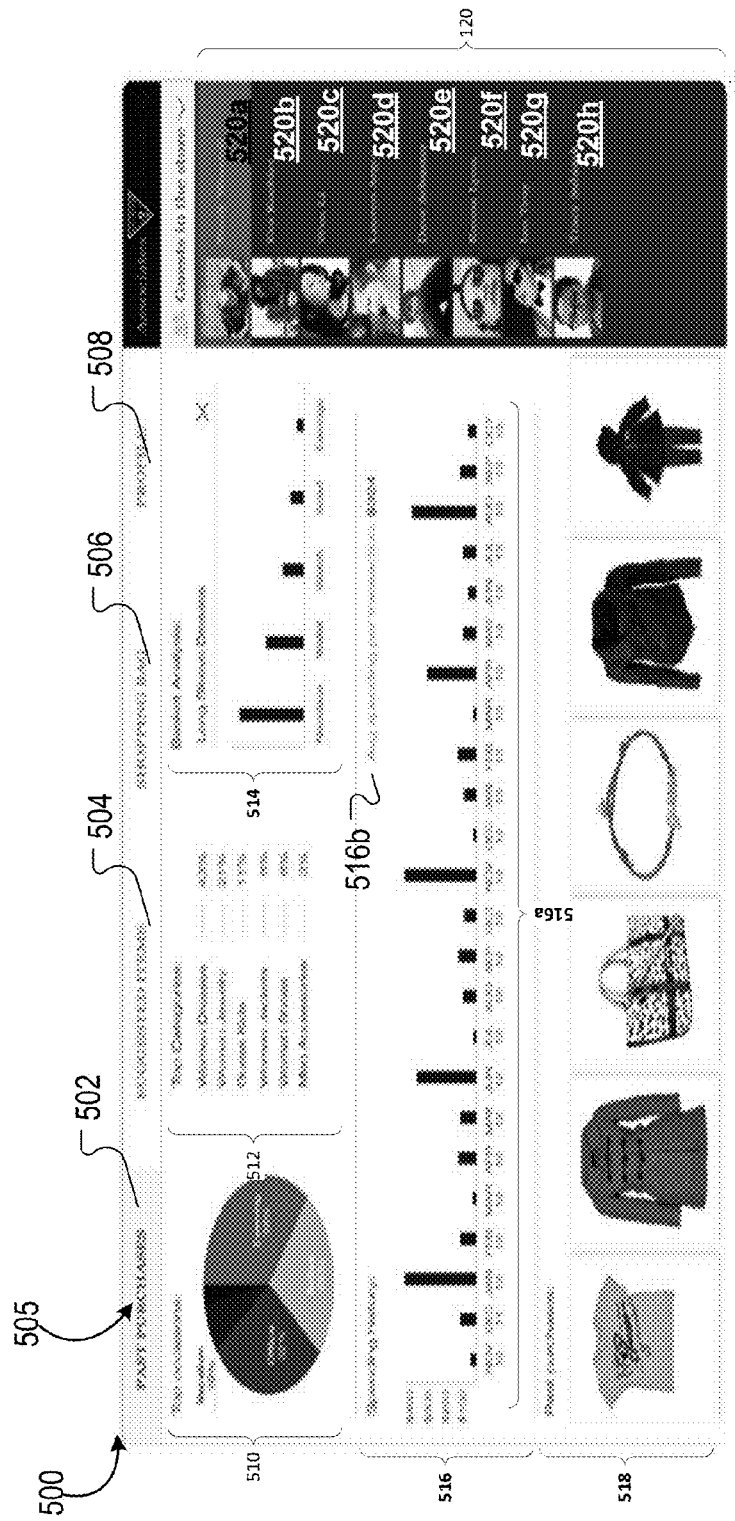

By way of example, FIG. 5 shows a user interface 500 of an intelligence dashboard also powered by an analytical in-memory data store (e.g., in-memory analytic data store 112 of FIG. 1). Interface 500 displays a customer report 505 to, e.g., a sales associate in a retail store. In an example, the sales associate can view the customer report 505 on a store computer.

In some examples, graphical user interface 500 includes customer portion 520 that displays information indicative of customers who are, e.g., in a particular geographic location (say, the retail store). Customer portion 520 displays customer information 520a-520h, with each item of customer information 520a-520h representing a customer. A user can select customer information 520a-520h by, for example, using a mouse to click on, or using a touch screen display to touch, a desired item of customer information 520a-520h. When an item of customer information 520a-520h is selected, interface 500 displays information pertaining to the selected customer. In the interface 500 of FIG. 5, a viewer of graphical user interface 500, e.g., the sales associate, has opted to view information associated with the customer represented by customer information 520a.

A query execution engine (e.g., query execution engine 270 of FIG. 2) can receive the user input, e.g., selection of customer information 520a-520h, and execute queries (e.g., queries 124a-c of FIG. 1) to access the market intelligence data stored in an in-memory analytic data store. In some examples, the query execution engine can receive the accessed data (e.g., data from the in-memory analytic data that complies with the filter criteria 410), perform analytics on the accessed data, and output the results of the analytics to user interface 500.

As shown, interface 500 includes past purchases link 502, selection of which causes interface 500 to display information indicative of past purchases of the customer that is selected via customer portion 520. Interface 500 also includes suggested items link, selection of which causes interface 500 to display suggestions information 504 indicative of suggested items that a particular customer (e.g., the customer selected from customer portion 520) may be interested in and want to purchase. Suggestions information 504 can based on analyzing data that is retrieved from an in-memory analytic data store. For example, suggestions information 504 can be based on customers' past purchases. Interface 500 includes shopping bag link 506, selection of which causes graphical user interface 500 to display items that a particular customer wishes to purchase. Interface 500 includes profile link 508, selection of which causes interface 500 to be updated to display a customer profile of a particular customer (e.g., the customer selected via currently present customer portion 520).

Interface 500 includes top occasions portion 510 that displays information (e.g., a graph) indicative of the top occasions for which a particular customer (e.g., customer 520a) has purchased merchandise. Information for top occasions portion 510 can be generated based on analytics performed on market intelligence data contained in an in-memory data store. In this example, top occasions portion 510 is generated by tracking past purchases of the customer and then categorizing the types of purchase (e.g., based on various occasions). In another example, top occasions portion 510 displays information indicative of the top occasions for a group of customers, e.g., rather than displaying the top occasions for a particular customer.

Interface 500 also displays top categories information 512, e.g., information specifying top categories of goods that have been purchased by a particular customer and/or by a group of customers at a retail store. Information for top categories portion 510 can be generated based on analytics performed on market intelligence data pertaining to the particular customer and/or the group of customers contained in an in-memory data store. In some implementations, interface 500 can include basket analysis portion 514—for display of information indicative of types of goods that are currently in an electronic shopping cart of a customer.

Graphical user interface 500 also includes spending history portion 516 to display information indicative of how much money a particular customer (e.g., the customer selected in portion 520) has spent with the retailer over a period of time. Information for spending history portion 516 can be generated based on analytics performed on market intelligence data pertaining to the particular customer contained in an in-memory data store. Spending history portion 516 can include a timeline 516a, e.g., a representation of the period of time over which spending is tracked. Spending history portion 516 also includes information 516b that specifies an average amount of money a particular customer has spent with the retailer over a period of time. Interface 500 also includes portion 518 for display of information indicative of past purchases and/or transactions of a particular customer.

Figure 6:
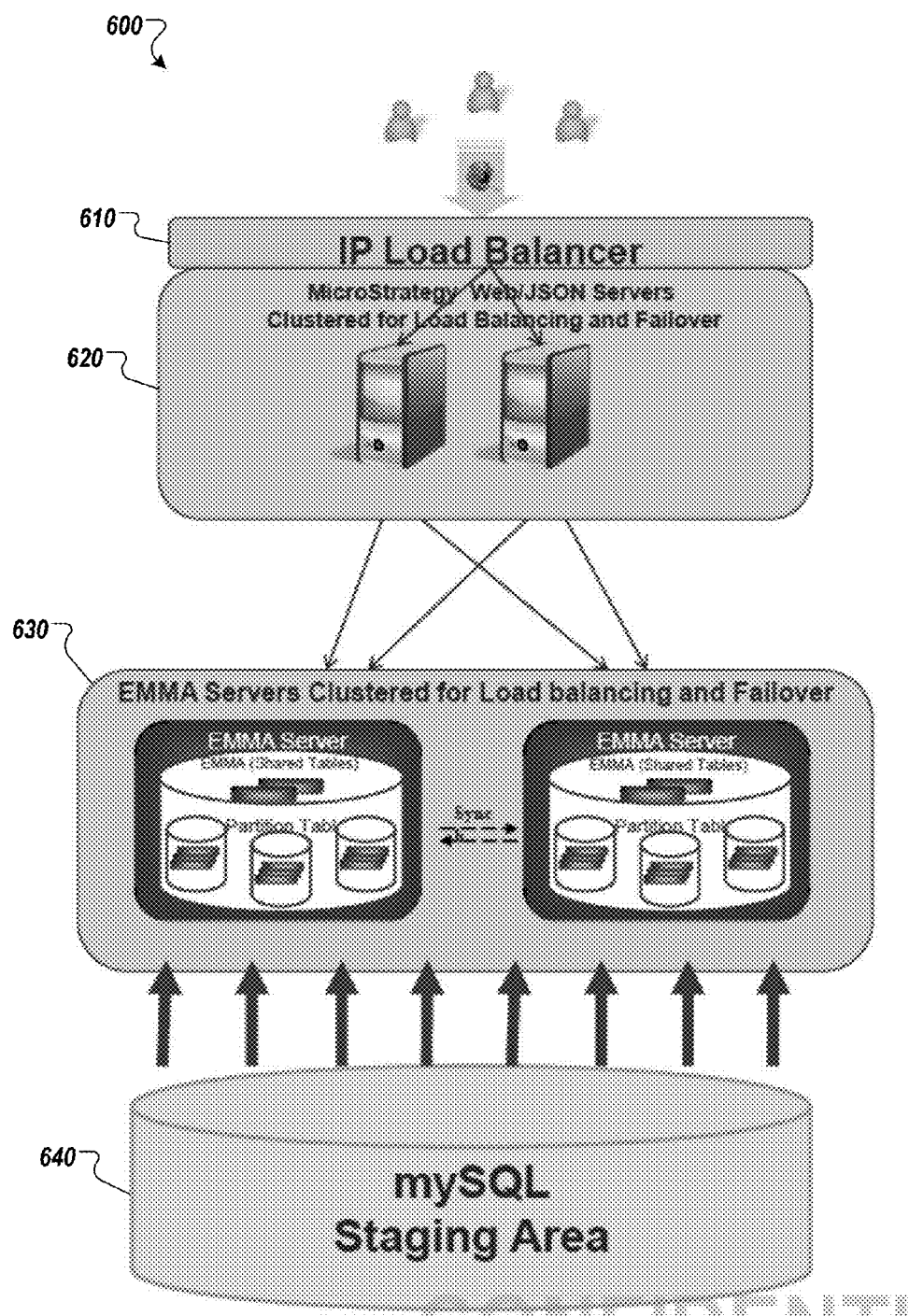
FIGS. 6 and 7 are block diagrams illustrating example topologies for applications leveraging an in-memory, distributed, analytic data store.
Figure 7:
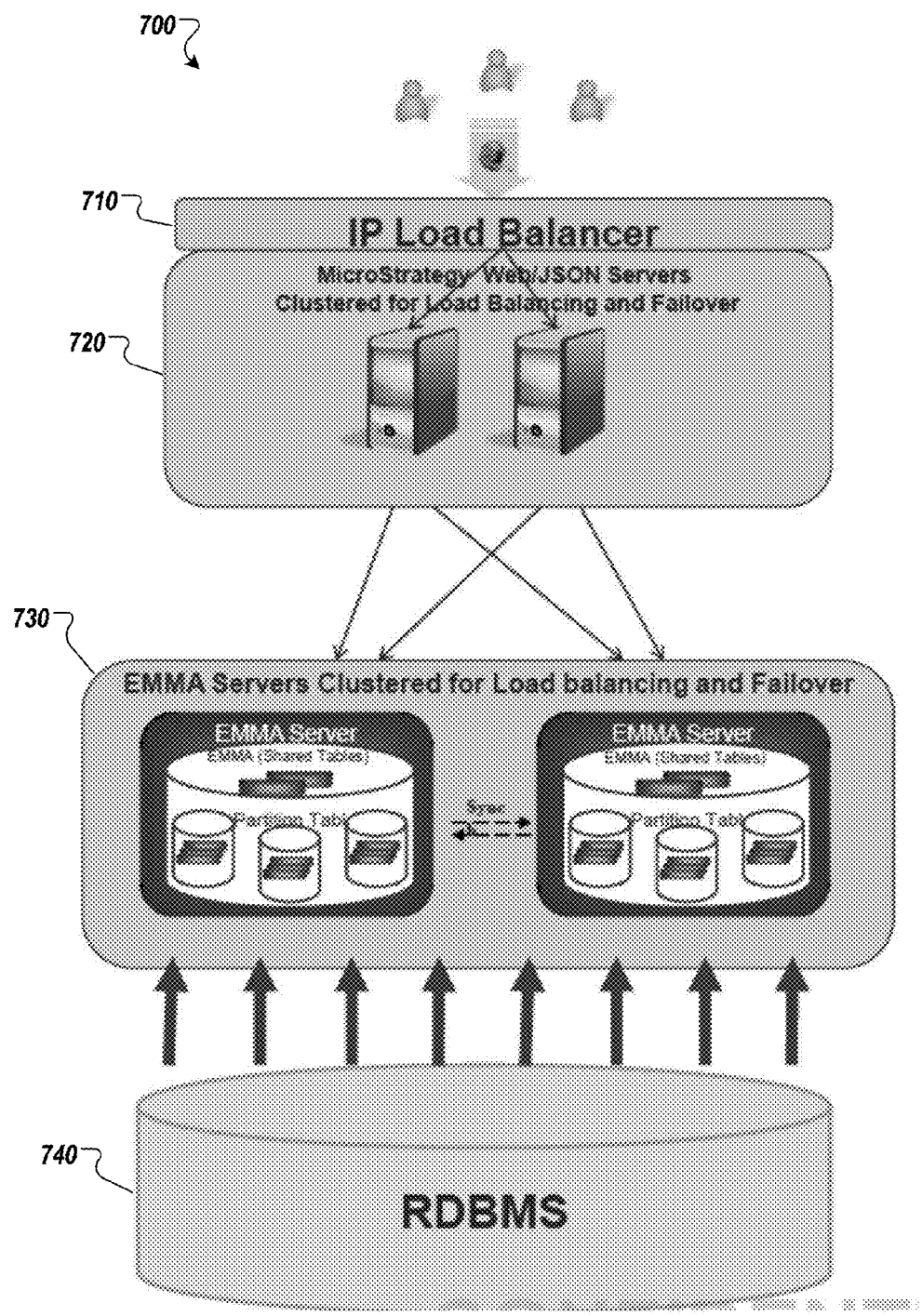

FIGS. 6 and 7 illustrate example topologies for applications leveraging an in-memory, distributed, analytic data store. In FIG. 5, an example topology 600 includes an Internet Protocol (IP) load balancer 610, multiple web server nodes 620, multiple in-memory analytic data store nodes 630, and a data staging area 640. The IP load balancer 610 receives user requests over the Internet and balances the user requests across the web server nodes 620. The web server nodes 620 process the user requests and access data needed to serve the user requests from the multiple in-memory analytic data store nodes 630. Each web server node can use the operating system RHEL 6.2, can have a 12 core Intel Xeon @ 2.24 GHz central processing unit, and can have 32 GB of RAM.

The multiple in-memory analytic data store nodes 630 store data in a partitioned manner and perform parallel processing of the partitioned data. The multiple in-memory analytic data store nodes 630 are clustered for load balancing and failover and serve queries/requests from the web server nodes 620. The multiple in-memory analytic data store nodes 630 communicate with one another to perform synchronization of changes made to the dataset. Each in-memory analytic data store node can use the operating system RHEL 6.2, can have a 32 core Intel Xeon @ 2.24 GHz central processing unit, and can have 1 TB of RAM. The full dataset can be replicated on each server.

The data staging area 640 accesses data to be loaded into the in-memory analytic data store nodes 630. The data staging area 640 stages the data in a manner that enables parallel loading of the data into the in-memory analytic data store nodes 630.

In FIG. 7, an example topology 700 includes an IP load balancer 510, multiple web server nodes 720, multiple in-memory analytic data store nodes 730, and a relational database management system (RDBMS) 740. The IP load balancer 710 receives user requests over the Internet and balances the user requests across the web server nodes 720. The web server nodes 720 process the user requests and access data needed to serve the user requests from the multiple in-memory analytic data store nodes 730. Each web server node can use the operating system Windows Server 2003 Enterprise x64 Edition (SP2), can have a Quad Core Intel Xeon L5520 @ 2.27 GHz central processing unit, and can have 6 GB of RAM.

The multiple in-memory analytic data store nodes 730 store data in a partitioned manner and perform parallel processing of the partitioned data. The multiple in-memory analytic data store nodes 730 are clustered for load balancing and failover and serve queries/requests from the web server nodes 720. The multiple in-memory analytic data store nodes 730 communicate with one another to perform synchronization of changes made to the dataset. Each in-memory analytic data store node can be a model Sun Fire X4800 M2 server, can use the operating system RHEL 6.1, can have an 80 core Intel Xeon @ 2.40 GHz with hyper threading central processing unit, and can have 1 TB of RAM. The full dataset can be replicated on each server.

The RDBMS 740 stores data to be loaded into the in-memory analytic data store nodes 730. In some implementations, the RDBMS 740 loads data into the in-memory analytic data store nodes 730 in parallel.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or large clusters of servers, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications can be made without departing from the spirit and scope of the disclosure. Accordingly, other implementations are within the scope of the disclosure.

What is claimed is:

1. A computer-implemented method comprising:
distributing an in-memory data store over a plurality of independent data partitions;
associating each of the plurality of independent data partitions with at least one of a plurality of processing units such that one or more data sets in one of the plurality of independent data partition are processed by a respective at least one of the plurality of processing units;

providing a query execution engine for causing the plurality of processing units to execute, in parallel, a series of queries to the plurality of independent data partitions;

receiving a transaction to be processed on the in-memory data store for an interface of a dashboard application;

determining that a visualization of the interface represents first data stored in a first independent data partition of the plurality of independent data partitions and second data stored in a second independent data partition of the plurality of independent data partitions;

based on the transaction and based on the first data being stored in the first independent data partition of the plurality of independent data partitions, generating a first query for accessing the first data stored in the first independent data partition of the plurality of independent data partitions;

based on the transaction and based on the second data being stored in the second independent data partition of the plurality of independent data partitions, generating a second query for accessing the second data stored in the second independent data partition of the plurality of independent data partitions; and providing, for execution in parallel, the first query to the first independent data partition and the second query to the second independent data partition.

2. The computer-implemented method of claim 1 wherein one or more of the plurality of processing units comprise individual processor cores of a multi-core processor.

3. The computer-implemented method of claim 1, wherein the distributing the in-memory data store over the plurality of independent data partitions comprises partitioning one or more tables of the in-memory data store across the plurality of independent data partitions as the plurality of independent data partitions.

4. The computer-implemented method of claim 1, further comprising sharing one or more tables of the in-memory data store over the plurality of independent data partitions.

5. The computer-implemented method of claim 1, further comprising presenting, within the interface of the dashboard application, a representation of results from the processing of the first query and the second query.

6. The computer-implemented method of claim 5, further comprising:
providing, via the dashboard application, a user interface for receiving user input defining one or more filters related to first desired information; and
generating the first query and the second query in response to the user input defining the one or more filters related to the first desired information.

7. The computer-implemented method of claim 6, wherein the first desired information comprises market intelligence data.

8. The computer-implemented method of claim 7, further comprising loading into the in-memory data store all market intelligence data used by the dashboard application.

9. The computer-implemented method of claim 1, wherein a master node and a worker node comprise one or more of the plurality of processing units.

10. The computer-implemented method of claim 1, further comprising:

monitoring a processing status of the plurality of processing units; and
balancing a processing load across the plurality of processing units in response to the monitored processing status.

11. The computer-implemented method of claim 1, further comprising:
detecting one of a failure state or an abnormal condition state of the at least one of the plurality of processing units; and
in response to the detected state, effecting a failover to another one of the plurality of processing units to ensure continued processing of the first query and the second query.

12. The computer-implemented method of claim 1, further comprising, based on a user input, initiating the transaction at a selected one of a) an application programming interface layer, b) a dashboard engine, or c) both the application programming interface layer and the dashboard engine.

13. The computer-implemented method of claim 1, further comprising loading all data associated with a complete application into the in-memory data store.

14. The computer-implemented method of claim 1, further comprising loading two or more star schemas into the in-memory data store.

15. The computer-implemented method of claim 1, further comprising loading into the in-memory data store two or more fact tables.

16. The computer-implemented method of claim 15, wherein the fact tables comprise fact tables with varying levels of granularity.

17. The computer-implemented method of claim 1, further comprising loading into the in-memory data store one or more sets of many-to-many relationship tables.

18. A computer-implemented method comprising:
receiving a transaction to be carried out on an in-memory data store for an interface of a dashboard application;
determining that a visualization of the interface represents first data stored in a first independent data partition of the in-memory data store and second data stored in a second independent data partition of the in-memory data store;
based on the transaction and based on the first data stored in the first independent data partition of the in-memory data store, generating a first query for accessing the first independent data partition of the in-memory data store;
based on the transaction and based on the second data being stored in the second independent data partition of the in-memory data store, generating a second query for accessing the second data stored in the second independent data partition of the in-memory data store;
executing, in parallel, by a first processing unit associated with the first independent data partition, and by a second processing unit associated with the second independent data partition, the first query and the second query; and
updating, within the interface of the dashboard application, the visualization based on results from executing the first query and the second query in the in-memory data store.

* * * * *